US009257738B2

(12) United States Patent
Lim et al.

(10) Patent No.: US 9,257,738 B2
(45) Date of Patent: Feb. 9, 2016

(54) MOBILE TERMINAL, AND METHOD FOR IMPROVING RADIATION PERFORMANCE AND SPECIFIC ABSORPTION RATE OF AN ANTENNA OF A MOBILE TERMINAL

(75) Inventors: Young Kon Lim, Suwon-si (KR); Joo Hwan Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 223 days.

(21) Appl. No.: 13/399,447

(22) Filed: Feb. 17, 2012

(65) Prior Publication Data

US 2013/0090072 A1 Apr. 11, 2013

(30) Foreign Application Priority Data

Oct. 10, 2011 (KR) ........................ 10-2011-0102916

(51) Int. Cl.

| | |
|---|---|
| ***H01Q 11/12*** | (2006.01) |
| ***H04B 1/04*** | (2006.01) |
| ***H01Q 1/24*** | (2006.01) |
| ***H01Q 1/38*** | (2006.01) |
| ***H01Q 1/48*** | (2006.01) |
| ***H01Q 9/04*** | (2006.01) |
| ***H01Q 3/24*** | (2006.01) |

(52) U.S. Cl.
CPC ............... *H01Q 1/243* (2013.01); *H01Q 1/245* (2013.01); *H01Q 1/38* (2013.01); *H01Q 1/48* (2013.01); *H01Q 3/24* (2013.01); *H01Q 9/0421* (2013.01)

(58) Field of Classification Search
CPC ...................................................... H04B 1/3838
USPC .............. 455/120, 121, 123, 125, 129, 575.5, 455/575.7
See application file for complete search history.

(56) References Cited

U.S. PATENT DOCUMENTS

| | | | | |
|---|---|---|---|---|
| 2003/0076272 | A1* | 4/2003 | Kurjenheimo et al. | 343/829 |
| 2008/0143614 | A1* | 6/2008 | Park et al. | 343/702 |
| 2008/0194302 | A1* | 8/2008 | Castaneda et al. | 455/575.3 |
| 2010/0164812 | A1* | 7/2010 | Ganeshan et al. | 343/702 |
| 2010/0214189 | A1* | 8/2010 | Kanazawa | 343/829 |
| 2012/0274538 | A1* | 11/2012 | Tsou et al. | 343/876 |

FOREIGN PATENT DOCUMENTS

| | | | |
|---|---|---|---|
| EP | 1701406 | A1 | 9/2006 |
| WO | 03-026063 | A1 | 3/2003 |

* cited by examiner

*Primary Examiner* — Ping Hsieh
(74) *Attorney, Agent, or Firm* — Jefferson IP Law, LLP

(57) ABSTRACT

A method and a mobile terminal of improving radiation performance and Specific Absorption Rate (SAR) of an antenna are provided. The mobile terminal includes a controller for generating a control signal for switching a ground according to a frequency band used by an antenna, and a switch unit for switching a contact point for each frequency band according to the control signal.

14 Claims, 16 Drawing Sheets

MOBILE TERMINAL, AND METHOD FOR IMPROVING RADIATION PERFORMANCE AND SPECIFIC ABSORPTION RATE OF AN ANTENNA OF A MOBILE TERMINAL

PRIORITY

This application claims the benefit under 35 U.S.C. §119 (a) of a Korean patent application filed on Oct. 10, 2011 in the Korean Intellectual Property Office and assigned Serial No. 10-2011-0102916, the entire disclosure of which is hereby incorporated by reference.

BACKGROUND OF THE INVENTION

1. Field of the Invention

The present invention relates to a mobile terminal, and a method for improving radiation performance and a Specific Absorption Rate (SAR) of an antenna of a mobile terminal. More particularly, the present invention relates to a portable terminal having increased radiation performance and a SAR according to various frequency bands supported by a mobile terminal, and a method for improving radiation performance and a SAR of an antenna.

2. Description of the Related Art

Recently, as mobile terminals become smaller while supporting increased bandwidth, larger frequency ranges are being covered by small antennas of the mobile terminals. As such, in order to improve a Total Radiated Power (TRP), a Total Isotropic Sensitivity (TIS) and the Specific Absorption Rate (SAR) according to the bandwidth or frequency range of one antenna, methods of changing the antenna pattern and antenna matching have been used. However, as an antenna gets smaller, it has become difficult to change a structure or pattern for such an antenna change or change an antenna matching. Hence, using such a method results in a limitation in tuning the antenna in accordance with various frequency bands.

Furthermore, in order to reduce a thickness of an external housing, metal is frequently used for a front case or a battery cover of a mobile terminal. In such a case, if metal is close to an antenna, the radiation performance of the antenna may be degraded. In order to mitigate such performance degradation, a certain distance between the metal and the radiation device of an antenna may be maintained, but maintaining the certain distance introduce a limitation in reducing a thickness of a mobile terminal, thereby lowering the product value. Additionally, it is possible that metal is not used around the radiation device of an antenna, but in such a case, a shape of the housing may be damaged by a double ejection structure that connects the metal structure with the plastic structure, and thereby the stability of the mobile terminal may decrease.

Furthermore, in order to mitigate the degraded radiation performance of an antenna due to the metal used in forming the external housing, it is possible to strengthen a ground connection by connecting a ground with the front case or battery cover made of metal. However, such a method entails an optimization method for the contact point of the ground when a mobile terminal is being developed because the antenna performance varies according to the type of the mobile terminal and the position of the contact point between the ground and the metal.

SUMMARY OF THE INVENTION

Aspects of the present invention are to address the above-mentioned problems and/or disadvantages and to provide at least the advantages described below. Accordingly, an aspect of the present invention is to provide a mobile terminal which can improve radiation performance and a Specific Absorption Rate (SAR) of an antenna by determining optimal conditions for the frequency band used by the mobile terminal, and a method for improving radiation performance and the SAR of a mobile terminal that supports various mobile communication methods.

Another aspect of the present invention is to provide a method for improving Total Radiated Power (TRP) and Total Isotropic Sensitivity (TIS) and SAR by finding the optimal conditions for each frequency band used by a mobile terminal that supports mobile communication methods classified into Wideband Code Division Multiple Access (WCDMA) 900, WCDMA 1900 and WCDMA 2100, or a mobile terminal that supports mobile communication methods classified into a low frequency band corresponding to a Global System for Mobile communication (GSM), and a high frequency band corresponding to WCDMA 1900 and WCDMA 2100.

Still another aspect of the present invention is to provide a mobile terminal in which it is not necessary to test all areas between a ground and an auxiliary part of the ground in order to find an optimal contact point position when the mobile terminal is being developed, by providing a switch structure that connects the ground to the auxiliary part of the ground.

Yet another aspect of the present invention is to provide a method for improving radiation performance and the SAR of an antenna of a mobile terminal which can maximize an efficiency of the antenna in the case of using a metal structure on a front or a back side of the mobile terminal.

In accordance with an aspect of the present invention, a mobile terminal is provided. The mobile terminal includes a controller for generating a control signal for switching a ground according to a frequency band used by an antenna, and a switch unit for switching a contact point for each frequency band according to the control signal.

In accordance with another aspect of the present invention, a method for improving radiation performance and the SAR of an antenna of a mobile terminal is provided. The method includes determining a frequency band used by the mobile terminal; searching for a switching condition corresponding to the frequency band; and controlling a ground so as to extend the ground according to the searched switching condition.

In accordance with still another aspect of the present invention, a mobile terminal including an antenna, a controller, a storage unit, and a ground is provided. The mobile terminal includes a ground auxiliary unit having a switchable connection to the ground, a switching unit for switching at least one switch providing the switchable connection between the ground auxiliary unit and the ground, and an antenna switch module for switching the at least one switch of the switch unit according to a control signal generated by the controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Hereinafter, exemplary embodiments of a mobile terminal and a method for improving radiation performance and a Specific Absorption Rate (SAR) of an antenna of a mobile terminal will be explained in detail with reference to the attached drawings.

Figure 1:
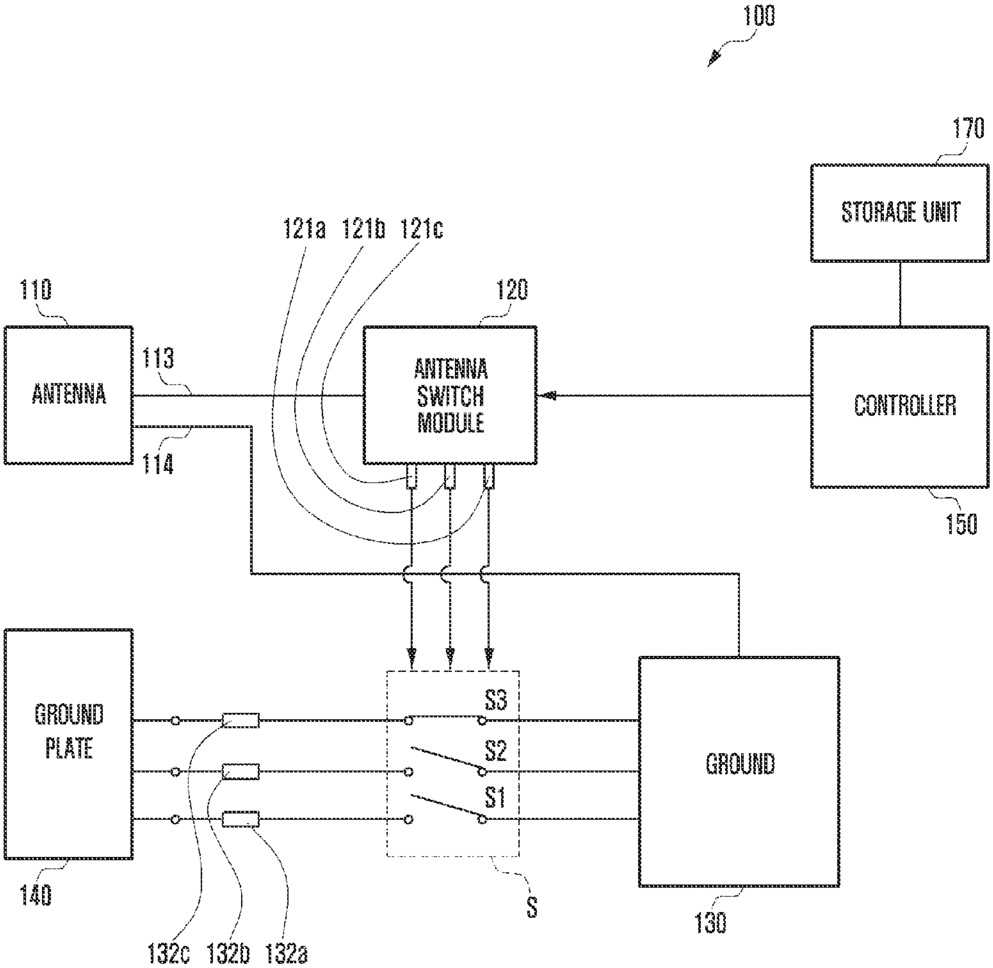
FIG. 1 is a block diagram illustrating a mobile terminal according to an exemplary embodiment of the present invention.
Figure 2:
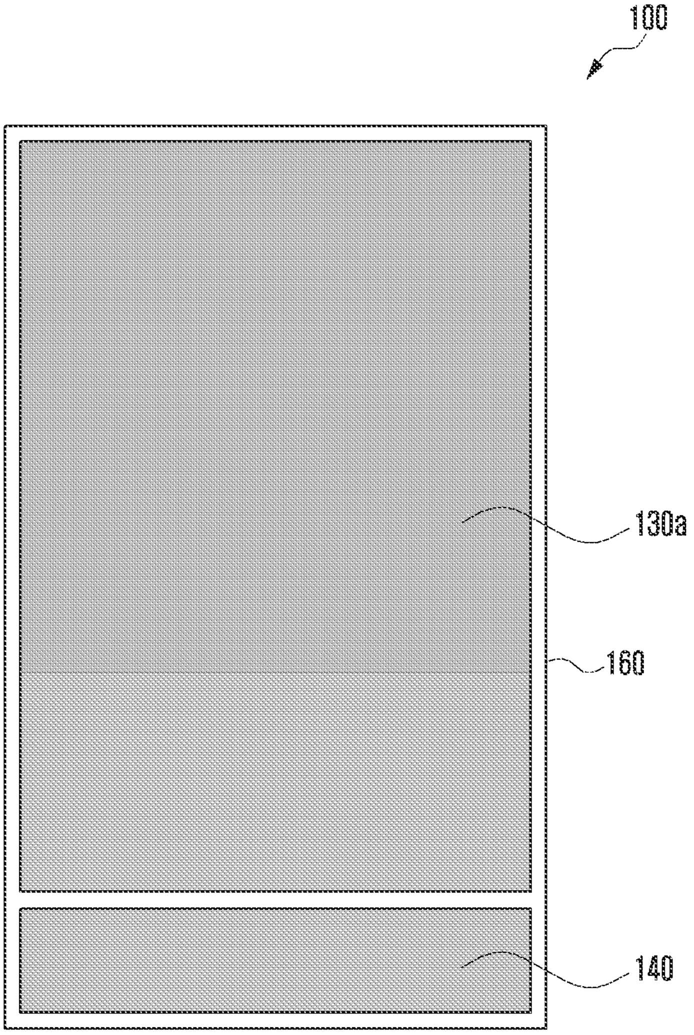
FIG. 2 is an internal plane diagram of a mobile terminal according to the exemplary embodiment of FIG. 1.
Figure 3:
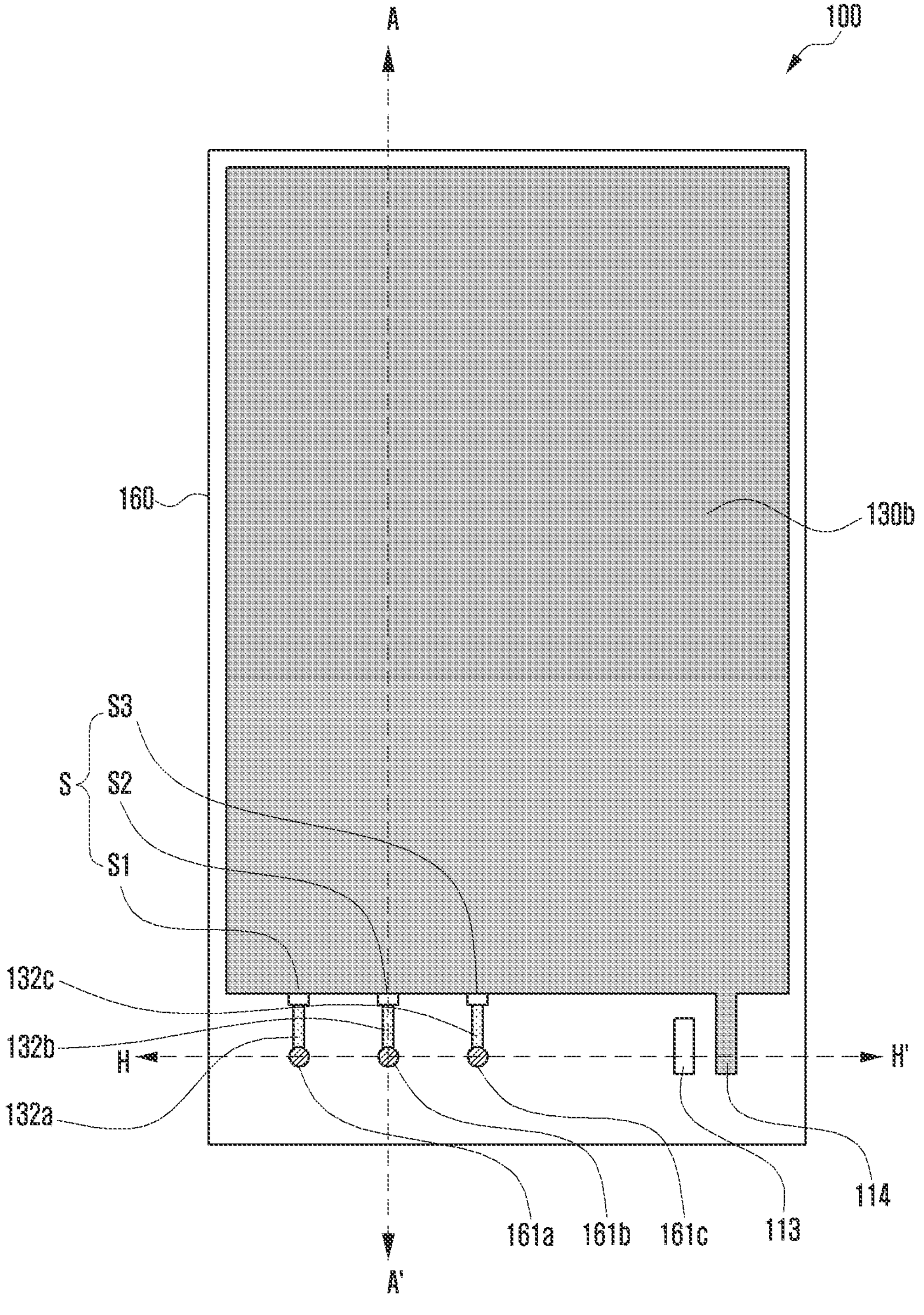
FIG. 3 is an internal bottom diagram of a mobile terminal according to the exemplary embodiment of FIG. 2.
Figure 4:
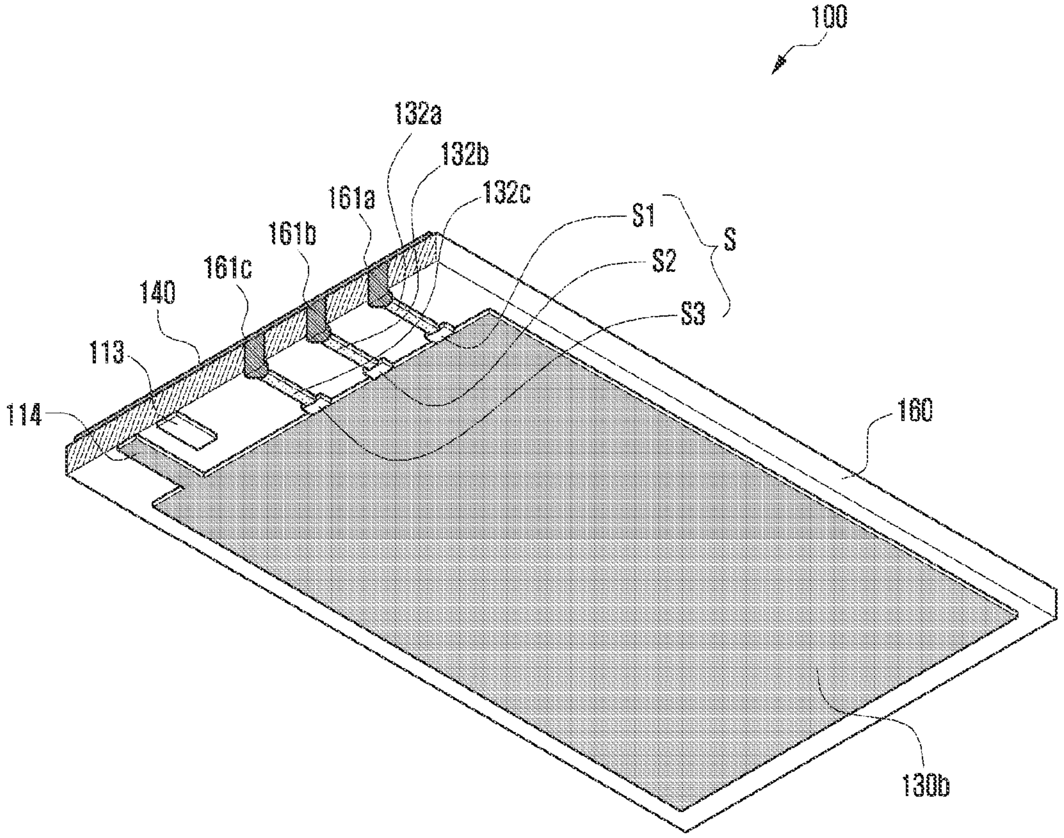
FIG. 4 is an internal exploded diagram of a mobile terminal which is cut along a cutting line H-H' illustrated in the exemplary embodiment of FIG. 3.
Figure 5:
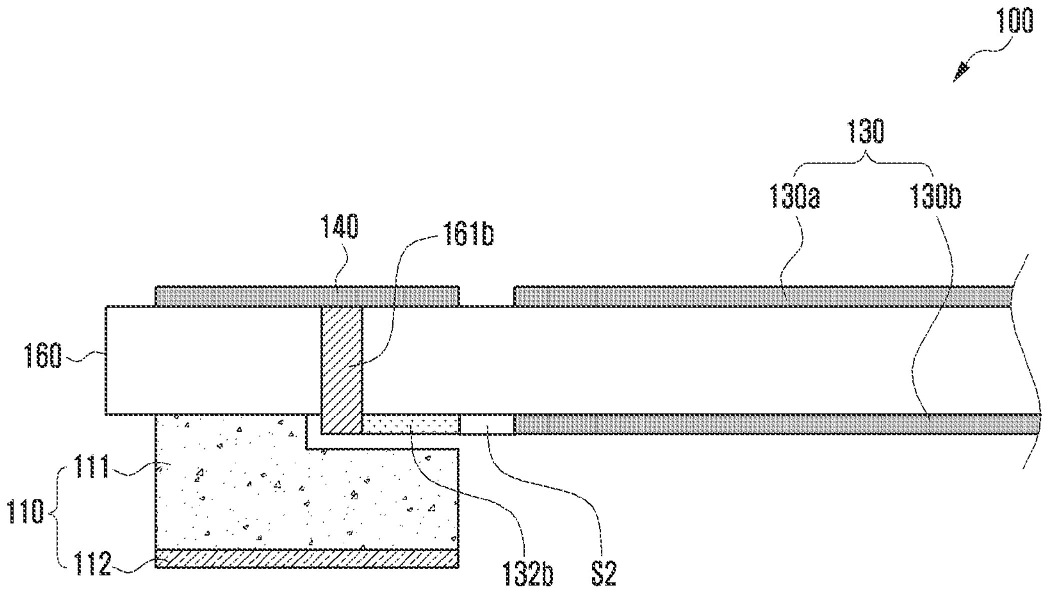
FIG. 5 is a partial sectional diagram of a mobile terminal which is cut along a cutting line A-A' illustrated in the exemplary embodiment of FIG. 3.

FIG. 1 is a block diagram illustrating a mobile terminal according to an exemplary embodiment of the present invention, FIG. 2 is an internal plane diagram of a mobile terminal according to the exemplary embodiment of FIG. 1, FIG. 3 is an internal bottom diagram of a mobile terminal illustrated in the exemplary embodiment of FIG. 2, FIG. 4 is an internal exploded diagram of a mobile terminal which is cut along a cutting line H-H' illustrated in the exemplary embodiment of FIG. 3, and FIG. 5 is a partial sectional diagram of a mobile terminal which is cut along a cutting line A-A' illustrated in the exemplary embodiment of FIG. 3. An antenna is not illustrated in FIGS. 3 and 4 for the convenience of explanation.

A mobile terminal 100 will be discussed with reference to FIGS. 1 to 5. The mobile terminal 100 includes an antenna 110, a ground 130, a ground plate 140, a controller 150, an antenna switch module 120, and a switch unit S. Here, the ground plate 140 according to the present exemplary embodiment is a ground auxiliary part. Herein, the ground auxiliary part refers to a metal part whose electric potential is lowered in case connected with the ground 130 by the switch unit S. For example, the ground auxiliary part can be a metal battery cover 240 of another exemplary embodiment which will be explained later, instead of the ground plate 140.

The antenna 110 is formed at one side of a surface of a Printed Circuit Board (PCB) 160 (see FIG. 2). In the present exemplary embodiment, the antenna 110 is formed on a lower side of the PCB 160 as illustrated in FIG. 5. The antenna 110 is a carrier antenna including a carrier 111 and an antenna pattern 112 formed on the carrier 111. The antenna pattern 112 is connected with a feeder wire 113 and a ground wire 114 as illustrated in FIGS. 3 and 4.

The ground 130 is formed on the PCB 160. The ground 130 includes an upper ground 130*a* that forms a top layer of the PCB 160, and a lower ground 130*b* that forms a bottom layer of the PCB 160. The upper ground 130*a* and the lower ground 130*b* are connected to each other by a penetration hole (not shown; also called a “through via”) which is filled with conductive materials that penetrate the PCB 160.

The ground plate 140 is formed at an opposite side of the side where the antenna 110 is formed, so as to be the surface of the PCB 160. In the case of the present exemplary embodiment, the ground plate 140 is disposed away from the upper ground 130*a*, and is formed on the upper side of the PCB 160 as illustrated in FIG. 5. In a case where the ground plate 140 is connected with the ground 130 by the switch unit S, then the ground plate 140 extends the ground as the electric potential is lowered.

The controller 150 generates a control signal according to a switching table corresponding to the frequency band of the antenna 110, and is connected with the antenna switch module 120. Specifically, the controller 150 determines the current frequency band used by the mobile terminal 100 and searches for a switching condition using the switching table stored in a storage unit 170. The controller 150 searches for the switching condition corresponding to the current frequency band to which a mobile terminal 100 is connected, and controls the switch unit S according to the searched switching condition.

The antenna switch module 120 is for switching the path of a transmission signal and a reception signal of the antenna 110, wherein the transmission signal and the reception signal are in a supported certain frequency band. Additionally, the antenna switch module 120 generates a switch operating signal that is transmitted to the switch unit S according to a control signal generated from the controller 150. The antenna switch module 120 includes a first General Purpose Input/Output (GPIO) pin 121*a* that transmits a switch operating signal to a first switch S1, a second GPIO pin 121*b* that transmits a switch operating signal to a second switch S2, a third GPIO pin 121*c* that transmits a switch operating signal to a third switch S3.

The switch unit S is connected with the ground 130, and includes at least one of the switches S1, S2 and S3, and is operated according to the switch operating signal transmitted from the antenna switch module 120. That is, the switch unit S electrically connects or disconnects the ground 130 with the ground plate 140. In the case of the present exemplary embodiment, as shown in FIG. 1, the switch unit S includes the first switch S1, the second switch S2 and the third switch S3. However, the present invention is not limited thereto, and the switch unit S may include any suitable number of switches. Such a number of switches can be determined according to a number of divided frequency bands. That is, as in another exemplary embodiment which will be explained later, in a case where the frequency band is divided into two bands, i.e., the low band and the high band, the number of switches may be one so that there can be two switching conditions. For reference, when the number of switches is n, the number of switching conditions is $2^n$. In a case where the frequency bands are divided into three or more bands as in the present exemplary embodiment, the number of switches can be two or more in order to accommodate the three or more switching conditions.

Furthermore, in a case where the number of switches is two or more, then there can be $4(=2^2)$ or more switching conditions. Additionally, the switch unit S is connected with ends of first through third connection units 132*a*, 132*b*, 132*c*, which electrically connects the ground plate 140 with the switch unit S.

Hereinafter, the connection structure between the second switch S2 and the ground plate 140 will be explained with reference to FIGS. 4 and 5. One end of the second switch 131*b* is connected to the second connection unit 132*b*, and the other end is connected to the lower ground 130*b*. In the present exemplary embodiment, the second connection unit 132*b* is a 100Ω resistance, but the second connection unit 132*b* can simply be a PCB pattern, an inductor, a capacitor or any other suitable element providing connection. The second connection unit 132*b* is connected to one end of a penetration hole 161*b* which is filled with conductive material that penetrates the PCB 160. The other end of the penetration hole 161*b* is connected to the ground plate 140. The connection structure between the first switch S1 and the ground plate 140 and the connection structure between the third switch S3 and the ground plate 140 are similar to the connection structure between the second switch 131*b* and the ground plate, as illustrated in FIG. 4, and thus are respectively connected to the penetration holes 161*a* and 161*c*. In the present exemplary embodiment, because the number of switches S1, S2 and S3 is 3, the number of the connection units 132*a*, 132*b* and 132*c* is 3. However, the present invention is not limited thereto, and there may be any suitable number of connection units corresponding to the number of switches.

Figure 6:
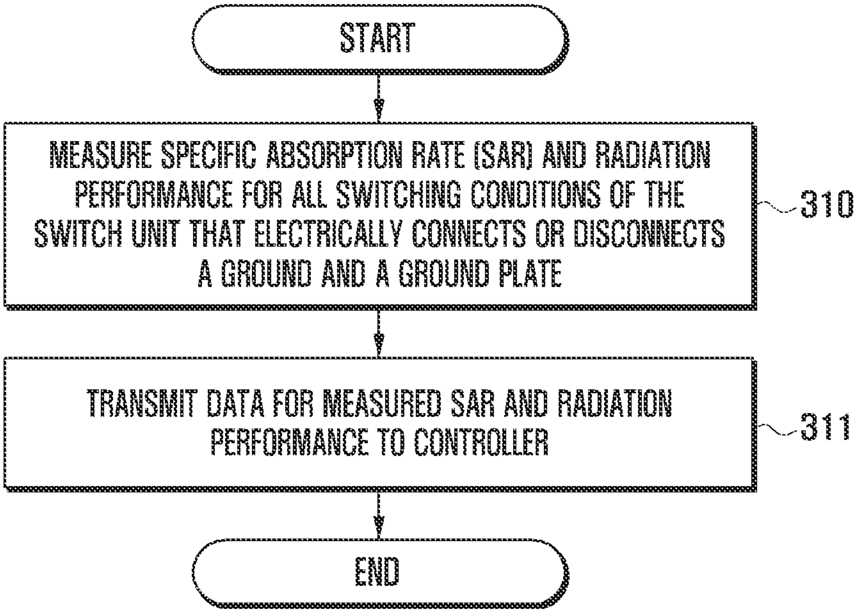
FIG. 6 is a flowchart illustrating a process of measuring and transmitting a Specific Absorption Rate (SAR) and radiation performance in a method of improving radiation performance and the SAR of an antenna of a mobile terminal according to the exemplary embodiment of FIG. 1.
Figure 9:
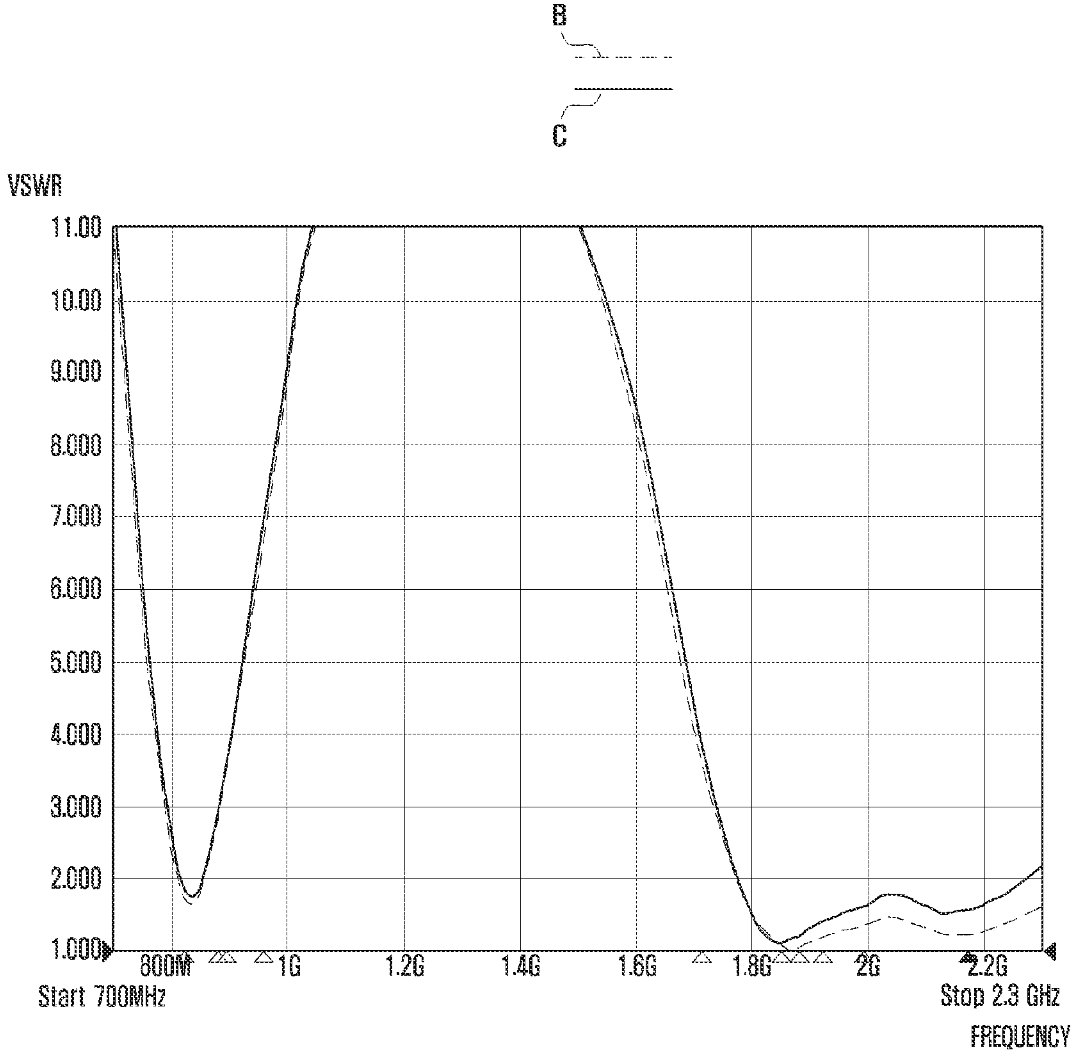
FIG. 9 illustrates a Voltage Standing Wave Ratio (VSWR) of an antenna when the switch unit of a mobile terminal is in a second switching condition and a fourth switching condition according to the exemplary embodiment of FIG. 1.

FIG. 6 is a flowchart illustrating a process of measuring and transmitting a SAR and radiation performance in a method of improving radiation performance and the SAR of an antenna of a mobile terminal according to the exemplary embodiment of FIG. 1, and FIG. 9 illustrates a Voltage Standing Wave Ratio (VSWR) of an antenna when the switch unit of a mobile terminal is in a second switching condition and a fourth switching condition according to the exemplary embodiment of FIG. 1.

Referring to FIGS. 6 and 9, a dotted line B indicates the VSWR according to a frequency of the fourth switching condition of Table 1, and a solid line C indicates the VSWR according to a frequency of the second switching condition of Table 1. Hereinafter, the process of measuring and transmitting the SAR and radiation performance in a method of improving radiation performance and SAR of the antenna of a mobile terminal according to the exemplary embodiment of FIG. 1 will be explained with reference to FIGS. 6 and 9.

Although not shown, in step 310, measuring equipment measures the SAR and radiation performance for all switching conditions of the switch unit S which electrically connects or disconnects the ground 130 with the ground plate 140 of the mobile terminal 100. The measuring equipment is used to measure the radiation performance and SAR of the antenna 110 of the mobile terminal 100, and is connected to the mobile terminal 100. Furthermore, the switching conditions of the switch unit S can be determined and changed by the controller 150 of the mobile terminal 100 through the connection between the measuring equipment and the mobile terminal 100.

Table 1 below shows the SAR and VSWR values measured according to different switching conditions. Here, as the VSWR decreases, the radiation performance increases. Furthermore, in Table 1, in a case where the measured SAR is within the SAR range allowed under predetermined limits for the SAR of a mobile terminal, the measured SAR is written as "allowed", and in a case where the measured SAR exceeds the allowed SAR range, the measured SAR is written as "exceeded". Assuming the first switching condition, wherein the first switch S1 is on, the second switch S2 is off, and the third switch S3 is off, the SAR and radiation performance for each of the frequency bands WCDMA900 (0.9 GHz), WCDMA1900 (1.9 GHz), and WCDMA2100 (2.1 GHz) are measured. As the on/off state of the first to third switches S1, S2 and S3 is changed, the measurement is conducted for the second through eighth conditions. In the present exemplary embodiment, because the number of switches is 3, there are $8(=2^3)$ switching conditions.

TABLE 1

| Switching | | | | WCDMA900 | | WCDMA1900 | | WCDMA2100 | |
|---|---|---|---|---|---|---|---|---|---|
| Condition No. | S1 | S2 | S3 | SAR | VSWR | SAR | VSWR | SAR | VSWR |
| 1 | On | Off | Off | Allowed | 5.0 | Allowed | 1.2 | Allowed | 1.0 |
| 2 | Off | Off | Off | Allowed | 3.7 | Allowed | 0.2 | Allowed | 0.7 |
| 3 | On | On | Off | Allowed | 4.0 | Allowed | 1.0 | Allowed | 0.5 |
| 4 | Off | On | Off | Exceeded | 3.7 | Exceeded | 0.4 | Allowed | 0.35 |
| 5 | On | Off | On | Allowed | 0.9 | Allowed | 2.0 | Allowed | 2.2 |
| 6 | Off | Off | On | Allowed | 1.1 | Allowed | 2.4 | Allowed | 2.6 |
| 7 | On | On | On | Allowed | 1.4 | Allowed | 3.0 | Allowed | 3.2 |
| 8 | Off | On | On | Allowed | 1.6 | Allowed | 3.6 | Allowed | 3.8 |

Next, in step 311, the measuring equipment transmits data on the SAR and radiation performance, which was measured at step 310 and stored in the measuring equipment, to the controller 150. As such, the controller 150 stores data for the SAR and radiation performance.

Figure 7:
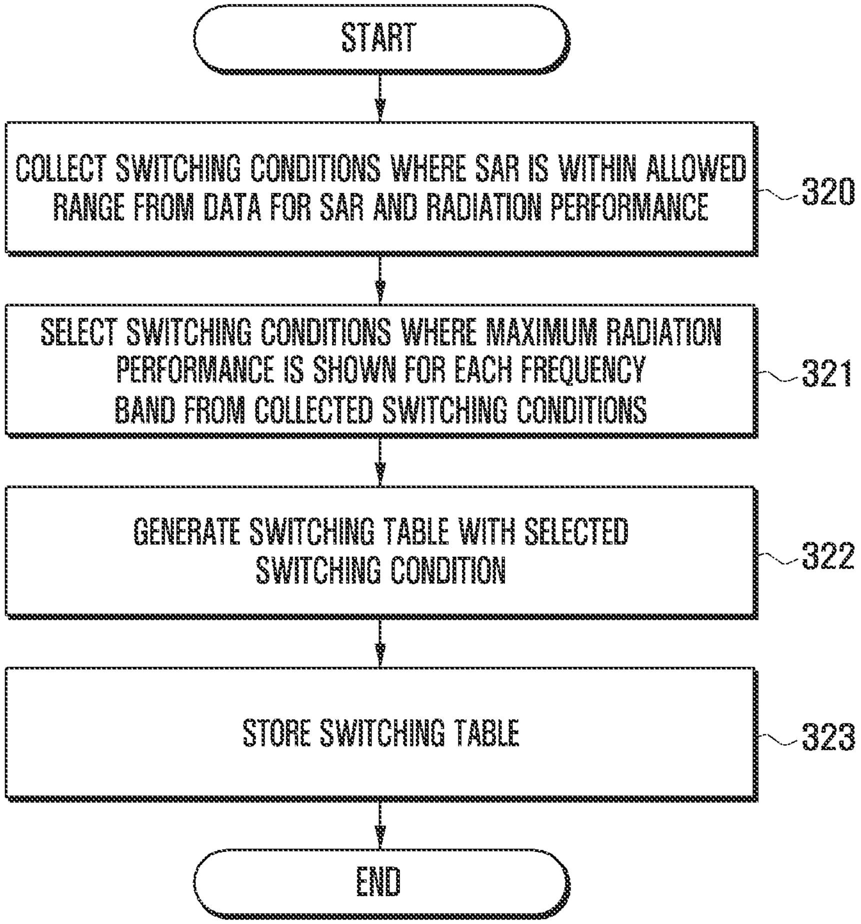
FIG. 7 is a flowchart illustrating a process of generating and storing a switching table in a method of improving radiation performance and a SAR of an antenna of a mobile terminal according to the exemplary embodiment of FIG. 1.

FIG. 7 is a flowchart illustrating a process of generating and storing a switching table in a method of improving radiation performance and the SAR of an antenna of a mobile terminal according to the exemplary embodiment of FIG. 1. Hereinafter, the process of generating and storing a switching table will be explained with reference to FIG. 7.

In step 320, the controller 150 collects switching conditions, when the SAR is within the allowed SAR range from data, such as the data shown in Table 1 for the SAR and radiation performance, that are transmitted from the measuring equipment. Referring to Table 1, in the case of WCDMA900 and WCDMA1900, the SAR measured during the fourth switching condition exceeds the allowed SAR range, and in the case of WCDMA2100, there was no switching condition at which the measured SAR exceeds the allowed SAR range. As such, in the case of WCDMA900 and WCDMA1900, first to third switching conditions and fifth to eighth switching conditions are collected, and in the case of WCDMA2100, all the switching conditions, i.e., the first to eighth switching conditions, are collected.

Next, in step 321, the controller selects a switching condition having the maximum radiation performance for each frequency band from among the switching conditions collected at step 320. Referring to Table 1, in the case of WCDMA900, the lowest VSWR appears at the fifth switching condition from among the collected switching conditions, and thus the radiation performance is in the maximum state in the fifth switching condition. As such, in the case of WCDMA900, the fifth switching condition is selected. In the case of WCDMA1900, the lowest VSWR appears at the second switching condition from among the collected switching conditions, and thus the maximum radiation performance appears at this condition. As such, in the case of WCDMA1900, the second switching condition is selected. In the case of WCDMA2100, the lowest VSWR appears at the fourth switching condition from among the collected switching conditions, and thus, in the case of WCDMA2100, the fourth switching condition is selected.

Next, in step 322, the controller 150 generates a switching table with the switching conditions selected in step 321. Table 2 below shows a switching table according to the present exemplary embodiment. In Table 2, "0" represents a signal for controlling the switch to be on, and "1" represents a signal for controlling the switch to be off.

TABLE 2

| Frequency | First switch control signal | Second switch control signal | Third switch control signal |
|---|---|---|---|
| WCDMA900 | 0 | 1 | 0 |
| WCDMA1900 | 1 | 1 | 1 |
| WCDMA2100 | 1 | 0 | 1 |

Next, in step 323, the controller 150 stores the switching table generated at step 322 in the storage unit 170.

Figure 8:
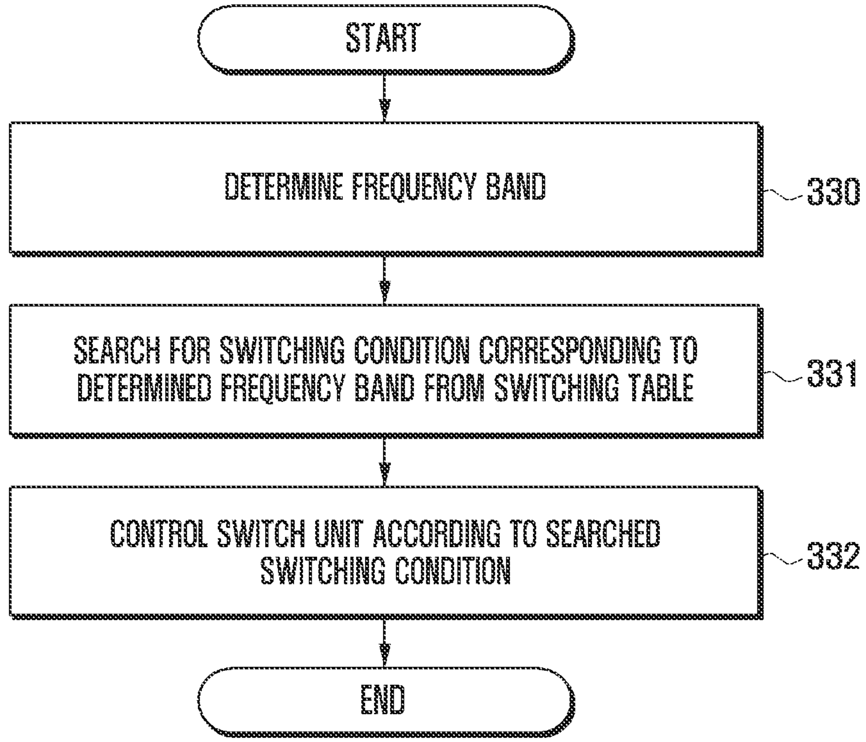
FIG. 8 is a flowchart illustrating a process of controlling a switch unit in a method of improving radiation performance and a SAR of an antenna of a mobile terminal according to the exemplary embodiment of FIG. 1.

FIG. 8 is a flowchart illustrating a process of controlling a switch unit in a method of improving radiation performance and the SAR of an antenna of a mobile terminal according to the exemplary embodiment of FIG. 1. Hereinafter, the process of controlling the switch unit S will be explained with reference to FIG. 8.

In step 330, the controller 150 determines the current frequency band used by a mobile terminal. For example, the frequency band can be determined as the controller 150 periodically checks the frequency band according to a preset period in the idle mode. Then, in step 331, the controller 150 searches for the switching condition corresponding to the current frequency band determined in step 330 using the switching table stored in the storage unit 170.

In step 332, the controller 150 controls the switch unit according to the switching condition searched at step 331. Such control of the switch unit may be performed via the control signal generated by the controller 150 and transmitted to the antenna switch module 120, wherein the antenna switch module 120 transmits the switch operating signal to the first to third switches S1, S2 and S3, respectively, via the first to third GPIO pins 121*a*, 121*b* and 121*c* according to the transmitted control signal.

According to the present exemplary embodiment, the radiation performance and the SAR according to the switching condition of the switch unit S, which electrically connects or disconnects the ground plate 140 and the ground 130, are measured. A switching table having the optimal switching condition for each frequency band according to such a measurement result is generated. The switch unit S is controlled according to the switching condition corresponding to the frequency band used by the mobile terminal, which is searched from the switching table containing the optimal switching condition for each frequency band. Therefore, the SAR and radiation performance can be improved by performing the switching optimized for various frequency bands.

Figure 10:
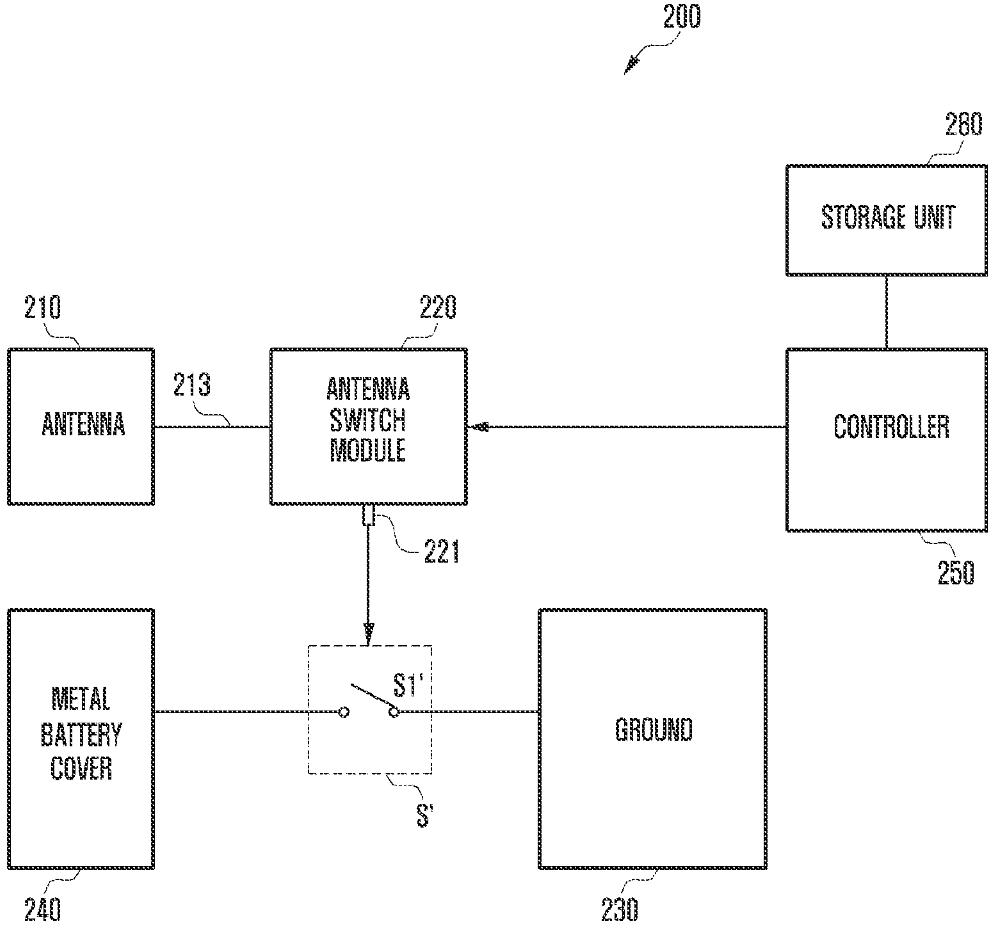
FIG. 10 is a block diagram of a mobile terminal according to another exemplary embodiment of the present invention.
Figure 11:
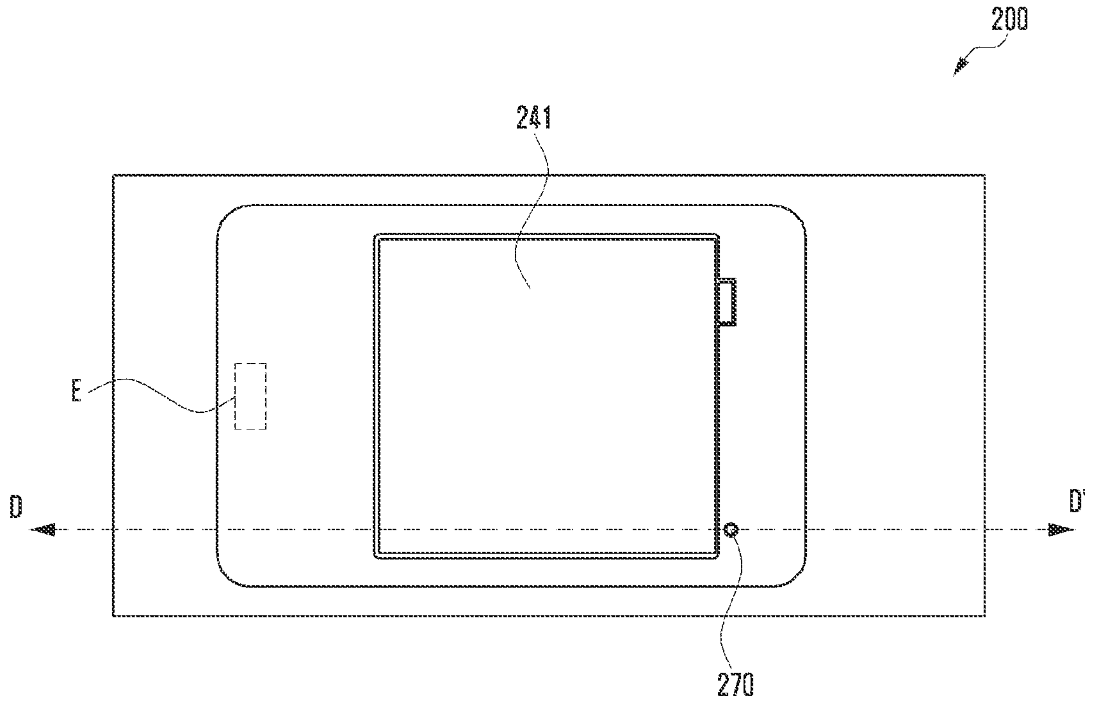
FIG. 11 is a rear diagram of a mobile terminal according to the exemplary embodiment of FIG. 10.
Figure 12:
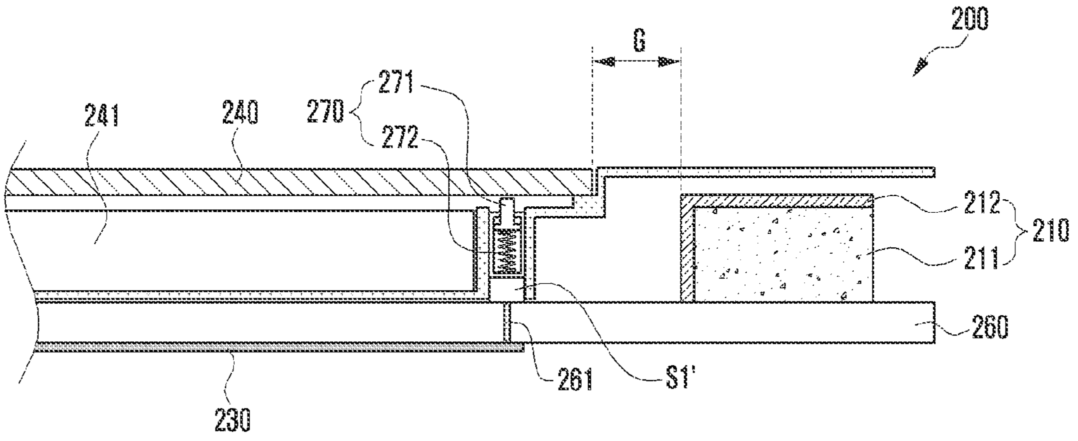
FIG. 12 is a partial sectional diagram of a mobile terminal which is cut along a cutting line D-D' illustrated in the exemplary embodiment of FIG. 11.

FIG. 10 is a block diagram of a mobile terminal according to another exemplary embodiment of the present invention, FIG. 11 is a rear diagram of a mobile terminal according to the exemplary embodiment of FIG. 10, and FIG. 12 is a partial sectional diagram of a mobile terminal which is cut along a cutting line D-D' illustrated in FIG. 11. For reference, FIG. 11 illustrates a mobile terminal 200 whose metal battery cover has been taken off.

Hereinafter, the mobile terminal 200 will be explained with reference to FIGS. 10 to 12. The mobile terminal 200 includes an antenna 210, a ground 230, a metal battery cover 240, a controller 250, an antenna switch module 220, a storage unit 280, and a switch unit S'. For reference, the metal battery cover 240, according to the present exemplary embodiment, is a ground auxiliary unit. As explained above, the ground auxiliary unit refers to a metal unit whose electric potential is lowered when connected with the ground 230 by the switch unit S'. The ground auxiliary unit can be formed of a metal that forms the external part of the mobile terminal 200, such as a metal front case (not shown), which is different than and separate from the metal battery cover 240.

The antenna is formed at a back side of the mobile terminal 201 from among the surfaces of a PCB 260. The antenna 210 includes a carrier 211 and an antenna pattern 212 which is formed on the carrier 211, as shown in FIG. 12. The antenna 210 illustrated in FIG. 10 is connected to a feeder wire 213 that is connected to the antenna switch module 220. However, the present invention is not limited thereto, and a ground wire (not shown) that is connected to the ground may be connected in a manner like the connection to the antenna 110, as illustrated in FIG. 1.

The ground 230 is formed on the PCB 260. In the present exemplary embodiment, the ground 230 is formed on a side of the PCB 260 that faces the front side of the mobile terminal 200 from among the surfaces of the PCB 260. However, the ground 230 may include an upper ground that forms an uppermost layer of the PCB 260 and a lower ground that forms a lowermost layer of the PCB 260, as shown in the exemplary embodiment of FIG. 5.

The metal battery cover 240 covers a battery 241 (see FIG. 11), forms an external part of the mobile terminal 200, and is made of metal. As shown in FIG. 12, a distance G between the metal battery cover 240 and the antenna 210 has a length of 4 mm or more in order to prevent deterioration of the radiation performance of the antenna 210. In a case where the metal battery cover 240 is connected to the ground 230 by the switch S', the metal battery cover 240 extends the ground as the electric potential is lowered.

The controller 250 generates a control signal according to the switching table including the frequency band of the antenna, and is connected to the antenna switch module 220. Specifically, the controller 250 determines the current frequency band used by the mobile terminal 200, and determines the switching condition from the switching table stored in the storage unit 280. The controller 250 searches for the switching condition corresponding to the current frequency band used by the mobile terminal 200, and controls the switch unit S' according to the determined switching condition.

The antenna switch module 220 switches a path of the transmission signal and the reception signal of the antenna 210 according to the frequency band used by the mobile terminal 200. In the present exemplary embodiment, the switch operating signal is generated according to the control signal generated by the controller 250. The switch operating signal is transmitted to the switch unit S'. The antenna switch module 220 includes a GPIO pin 221 that transmits the switch operating signal to the switch S', as illustrated in FIG. 10.

The switch unit S' is connected to the ground 230, and includes one or more switches S1' operated according to the switch operating signal transmitted from the antenna switch module 220. That is, the switch unit S' electrically connects or disconnects the ground 230 to the metal battery cover 240.

The switch S1' of the switch unit S' is electrically connected to the metal battery cover 240 through a contact point unit 270. In the present exemplary embodiment, the switch unit S' includes one switch S1', however the present invention is not limited thereto, and the switch unit S' may include two or more switches or any other suitable number of switches. Such a number of switches can be determined according to a number of classified frequency bands as illustrated in the exemplary embodiment of FIG. 1. For example, in a case where the number of classified frequency bands is three or four, one additional switch (not shown) may be added so that the total number of switches is 2, and thus there may be four ($=2^2$) switching conditions. Such an additional switch can be connected to another contact point unit (not shown), which is additionally disposed at the dotted line box E, as illustrated in FIG. 11.

Hereinafter, the connection structure between the switch S1' and the metal battery cover 240 will be explained with reference to FIG. 12. One end of the switch S1' is connected to the ground 230 via a penetration hole 261 which is filled with conductive materials that penetrate the PCB 260. The other end of the switch S1' is connected to the contact point unit 270 which contacts the metal battery cover 240. In the present exemplary embodiment, the contact point unit 270 includes a contact pin 271, which contacts the metal battery cover 240, and a pogo pin which includes an elastic member 272 connected to the contact pin 271. The elastic member 272 has elastic force so that the contact pin 271 pushed by the elastic force so as to contact the metal battery cover 240, and the elastic member 272 electrically connects the contact pin 271 with the switch S1'. In the present exemplary embodiment, the contact point 270 includes a pogo pin as the elastic member 272. However, the present invention is not limited thereto, and the contact point 270 may include a C clip, conductive tape or any other suitable element as the elastic member 272. For reference, in the present exemplary embodiment, because the number of switches S1' is one, the number of the contact point units 270 is also one. However, the number of the contact point units 270 may be two or more corresponding to the number of switches included in the switch unit S'.

According to the present exemplary embodiment, the switch unit S' connects or disconnects the metal battery cover 240 and the ground 230. Therefore, it is possible to achieve improved antenna performance in various frequency bands by generating control signals and operating the switch S' according to the switching table for each frequency band used by the mobile terminal 200. Furthermore, because the optimal antenna performance is achieved in various frequency bands by controlling the electric connection between the metal battery cover 240 and the ground 230 using the switch unit S', it is not necessary to determine an optimal position for the contact point unit 270 when a mobile terminal is being developed.

Figure 13:
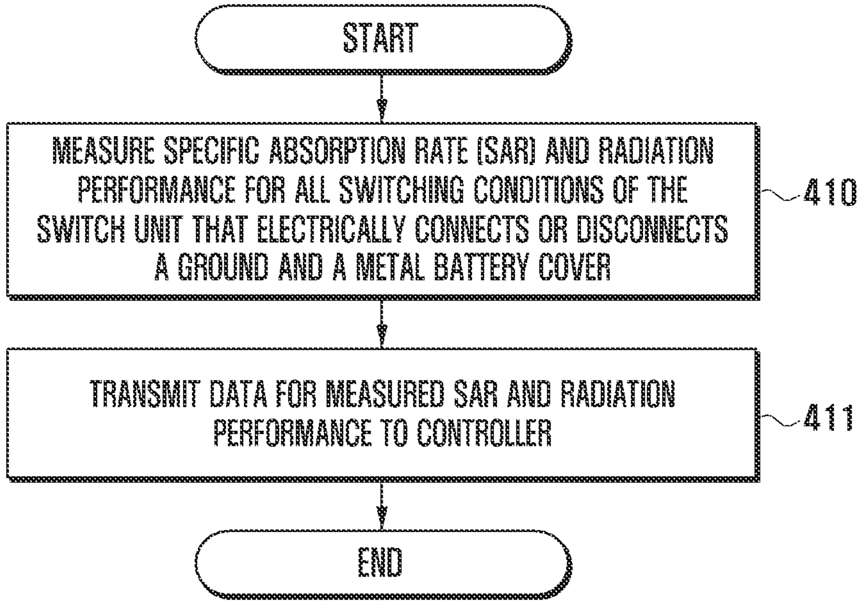
FIG. 13 is a flowchart illustrating a process of measuring and transmitting specific absorption rate and radiation performance in a method of improving radiation performance and specific absorption rate of an antenna of a mobile terminal according to the exemplary embodiment of FIG. 10.
Figure 16:
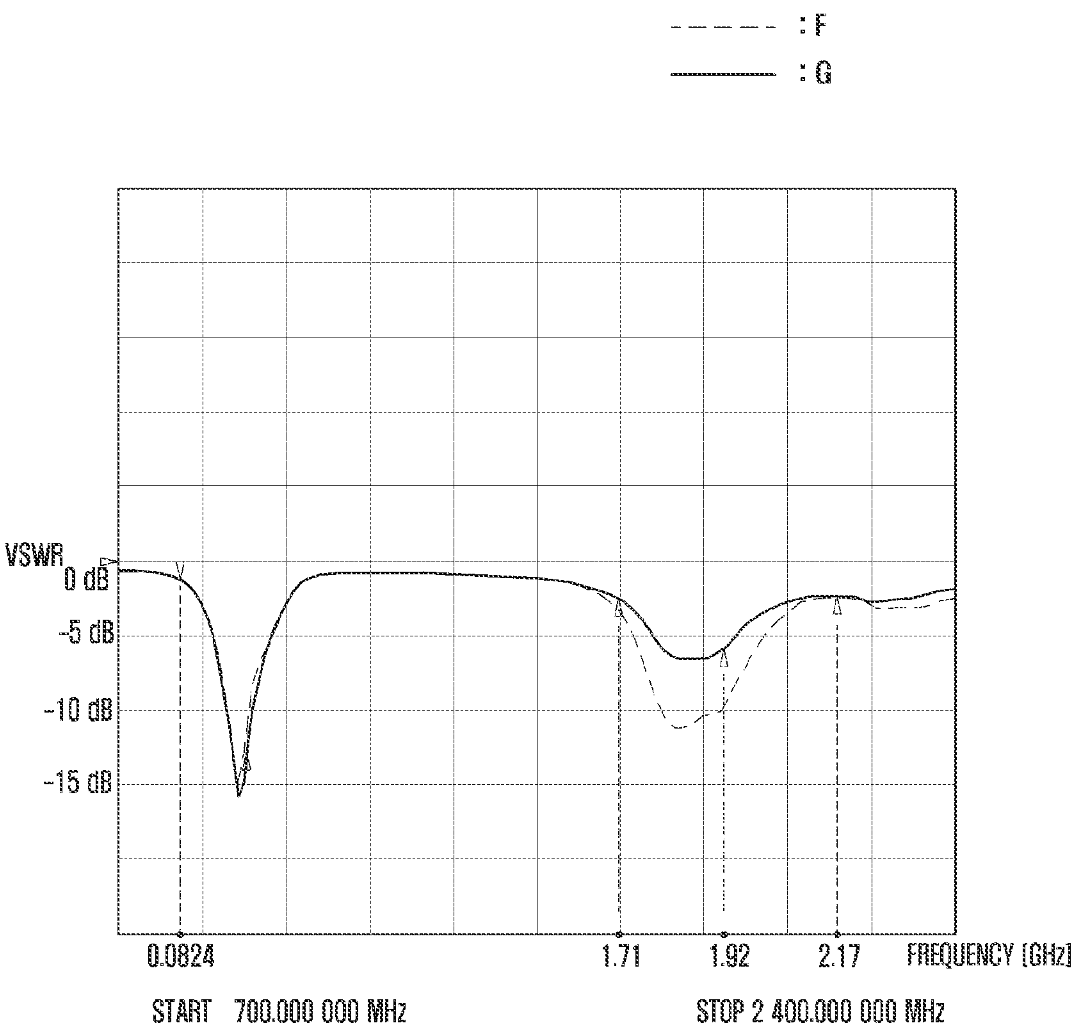
FIG. 16 illustrates a VSWR of an antenna according to the on/off state of a switch of a mobile terminal according to the exemplary embodiment of FIG. 10.

FIG. 13 is a flowchart illustrating a process of measuring and transmitting the SAR and radiation performance in a method of improving radiation performance and specific absorption rate of an antenna of a mobile terminal according to the exemplary embodiment of FIG. 10, and FIG. 16 illustrates a VSWR of an antenna according to the on/off state of a switch of a mobile terminal according to the exemplary embodiment of FIG. 10.

Referring to FIG. 16, the dotted line F refers to the VSWR according to the frequency when the switch S1' is in off state, and the solid line G refers to the VSWR according to the frequency when the switch S1' is in on state. Hereinafter, the process of measuring and transmitting the SAR and radiation performance in a method for improving the SAR and radiation performance of an antenna of a mobile terminal according to the present exemplary embodiment will be explained with reference to FIGS. 13 to 16.

The measuring equipment (not shown) measures the SAR and radiation performance for all switching conditions of the switch unit S' which electrically connects or disconnects the ground 230 and the metal battery cover 240 in step 410. For reference, the measuring equipment is separate equipment for measuring the radiation performance and the SAR of the antenna 210, and is connected to a mobile terminal 200 in order to transmit the measured SAR and radiation performance to the mobile terminal 200. Furthermore, the switching condition of the switch unit S' may be determined or changed by the controller 250 of the mobile terminal 200 through connection between the measuring equipment and the mobile terminal 200.

Table 3 below shows the SAR and antenna efficiency measured according to the switching condition. For reference, switching condition no. 1 is where the switch S1' is on, and switching condition no. 2 is the state where the switch S1' is off. Furthermore, the greater the antenna efficiency is, the greater the radiation performance is. The term "allowed" as used in Table 3 indicates that the measured SAR is within an allowed SAR range that is predetermined with respect to the SAR of a mobile terminal. For reference, the low band disclosed in Table 3 corresponds to a frequency band of a Global System for Mobile Communications (GSM) network, and the high band corresponds to the frequency bands of Digital Cellular System (DCS), WCDMA 1900 and WCDMA 2100 networks.

TABLE 3

| | | Switching Condition No. | | | |
|---|---|---|---|---|---|
| | | 1 | | 2 | |
| | | S1' | | | |
| | | On | | Off | |
| Frequency Band (GHz) | | SAR | Antenna Efficiency (%) | SAR | Antenna Efficiency (%) |
| Low Band | 0.824 | Allowed | 8 | Allowed | 8 |
| | 0.8512 | Allowed | 13 | Allowed | 13 |
| | 0.8784 | Allowed | 22 | Allowed | 21 |
| | 0.9056 | Allowed | 36 | Allowed | 34 |
| | 0.9328 | Allowed | 43 | Allowed | 40 |
| | 0.960 | Allowed | 39 | Allowed | 38 |
| High Band | 1.710 | Allowed | 10 | Allowed | 15 |
| | 1.745 | Allowed | 16 | Allowed | 23 |
| | 1.785 | Allowed | 23 | Allowed | 28 |
| | 1.805 | Allowed | 23 | Allowed | 27 |
| | 1.840 | Allowed | 28 | Allowed | 30 |
| | 1.880 | Allowed | 30 | Allowed | 32 |
| | 1.920 | Allowed | 27 | Allowed | 33 |
| | 1.950 | Allowed | 23 | Allowed | 30 |
| | 1.980 | Allowed | 20 | Allowed | 26 |
| | 2.110 | Allowed | 17 | Allowed | 18 |
| | 2.140 | Allowed | 18 | Allowed | 20 |
| | 2.170 | Allowed | 19 | Allowed | 21 |

The measuring equipment transmits the data about the SAR and radiation performance, which are measured at step 410 and are stored in the measuring equipment, to the controller 250 in step 411. As such, the controller 250 stores data about the SAR and radiation performance.

Figure 14:
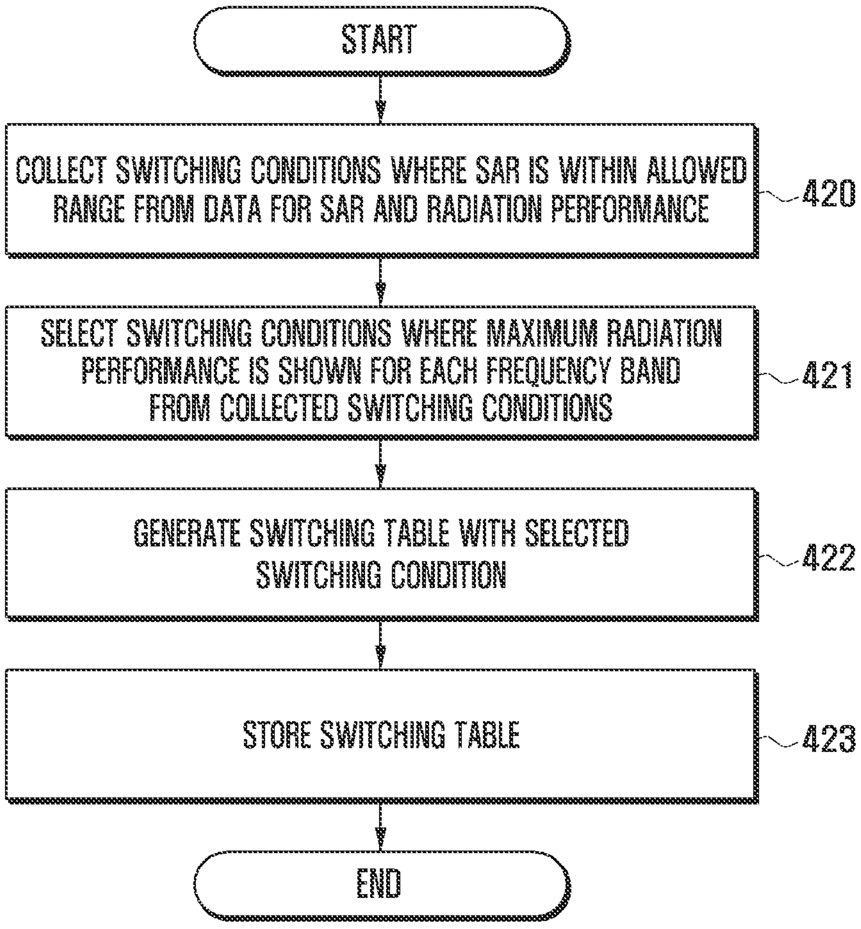
FIG. 14 is a flowchart illustrating a process of generating and storing a switching table in a method of improving radiation performance and a SAR of an antenna of a mobile terminal according to the exemplary embodiment of FIG. 10.

FIG. 14 is a flowchart illustrating a process of generating and storing a switching table in a method of improving radiation performance and the SAR of an antenna of a mobile terminal according to the exemplary embodiment of FIG. 10. Hereinafter, the process of generating and storing a switching table will be explained with reference to FIG. 14.

In step 420, when the SAR is within the allowed SAR range, the controller 250 collects switching conditions from the data about the SAR and radiation performance transmitted as determined by the measuring equipment. Referring to Table 3, in the present exemplary embodiment, the SAR is in the allowed ranges of both the first and second switching conditions for all bands of the low bands (0.0824 GHz to 0.960 GHz) and the high bands (1.710 GHz to 2.170 GHz). As such, the first and second switching conditions are collected for all bands of low bands and high bands.

Next, in step 421, the controller 250 selects the switching condition having the highest radiation performance for each frequency band from among the switching conditions collected at step 420. Referring to Table 3, in the case of the low band, the maximum radiation performance is determined via the maximum antenna efficiency that is shown to be in the first switching condition. As such, in the case of the low band, the first switching condition is selected. In the case of the high band, the maximum antenna efficiency is again used to determine the maximum radiation performance. As such, in the case of the high band, the second switching condition is selected. For reference, as illustrated in FIG. 16, in the case of the low band of 0.0824 GHz to 0.960 GHz, the VSWR at the time when the switch S1' is on is lower than the VSWR at the time when the switch S1' is off. In the case of the high band of 1.71 GHz to 2.17 GHz, the VSWR at the time when the switch S1' is off is lower than the VSWR at the time when the switch S1' is on.

Next, in step 422, the controller 250 generates a switching table with the switching condition selected at step 421. Table 4 below shows a switching table according to the present exemplary embodiment. For reference, in the case of Table 4, "0" represents a signal for turning the switch on, and "1" represents a signal for turning the switch off.

TABLE 4

| Frequency Band | Switch Control Signal |
|---|---|
| Low Band (0.824 GHz to 0.960 GHz) | 0 |
| High Band (1.710 GHz to 2.170 GHz) | 1 |

Next, the controller 250 stores the switching table generated at step 422 in the storage unit 280 in step 423.

Figure 15:
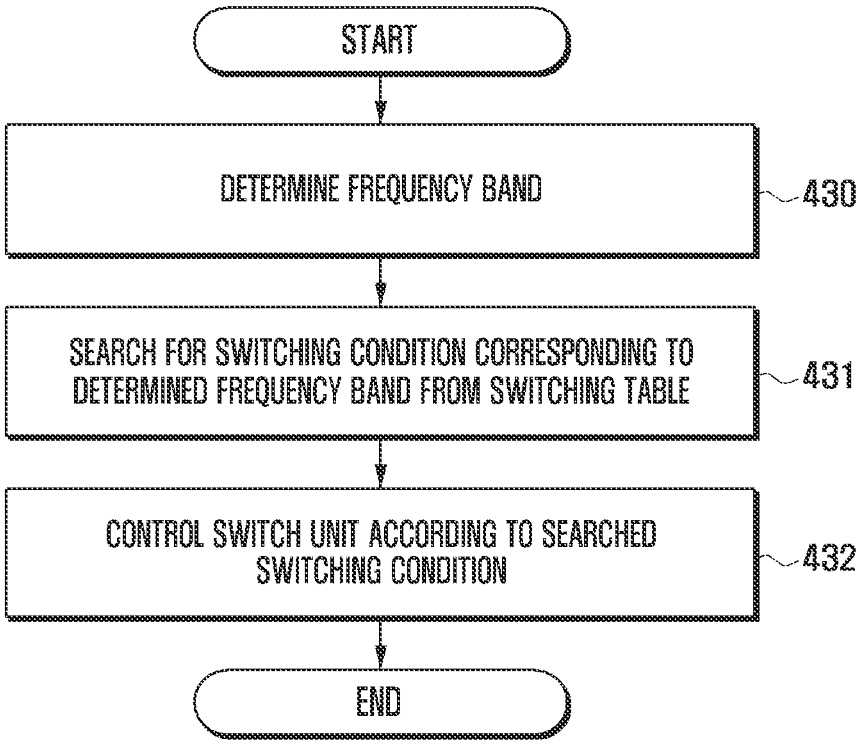
FIG. 15 is a flowchart illustrating a process of controlling a switch unit in a method of improving radiation performance and a SAR of an antenna of a mobile terminal according to the exemplary embodiment of FIG. 10.

FIG. 15 is a flowchart illustrating a process of controlling a switch unit in a method of improving radiation performance and specific absorption rate of an antenna of a mobile terminal according to the exemplary embodiment of FIG. 10. Hereinafter, the process of controlling the switch unit S' will be explained with reference to FIG. 15.

The controller 250 determines the current frequency band used by the mobile terminal 200 in step 430. The determination of the frequency band may be performed, for example, as the controller 250 periodically checks the frequency band according to a preset period in an idle state of the mobile terminal 200. Next, the controller 250 searches for the switching condition corresponding to the current frequency band determined at step 430 from the switching table stored in the storage unit 280 in step 431.

In step 432, the controller 250 controls the switch unit according to the switching condition searched at step 431. Such a control of the switch unit may be performed as the control signal generated by the controller 250 is transmitted to the antenna switch module 220, and the antenna switch module 220 transmits the switch operating signal to the switch S1' via the GPIO pin 221 according to the control signal transmitted by the antenna switch module 220.

According to the exemplary embodiments of the present invention, because contact point switching for the ground is performed for each frequency band according to the control signal generated according to the frequency band of an antenna, it is possible to improve a Total Radiated Power (TRP), a Total Isotropic Sensitivity (TIS) and the SAR by finding the optimal conditions corresponding to each frequency band used by a mobile terminal.

Furthermore, the switch unit does not find the optimal contact point position by testing all areas between the ground and the auxiliary part of the ground, but performs contact point switching in accordance with the frequency band used by the mobile terminal, thereby making it possible for respective switch units to be commonly used in each mobile terminal. Therefore, because it is unnecessary to find the optimal contact point position by testing all areas between the ground and the auxiliary part of the ground, unnecessary efforts can be reduced when developing and designing a mobile terminal. Furthermore, the radiation efficiency of an antenna can be improved by improving the tradeoff problem between a low band and a high band according to the contact point position between the ground and the auxiliary part of the ground.

While the present invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A mobile terminal comprising:

a controller configured to determine a frequency band, to generate a control signal according to a switching table including a switching condition corresponding to the determined frequency band, and to control connection between a ground and a ground auxiliary part based on the control signal, wherein the switching table is generated by:

collecting, according to the frequency band, at least a subset of switching conditions for which a Specific Absorption Ratio (SAR) is within a predetermined SAR range, selecting, according to the frequency band, a switching condition from the collected at least a subset of switching conditions for which a minimum Voltage Standing Wave Ratio (VSWR) appears, and generating the switching table based on the selected switching condition.

2. The mobile terminal of claim 1, further comprising a switch unit for switching a contact point for each frequency band according to the control signal, wherein the contact point selectively connects the ground to the ground auxiliary part by the switch unit.

3. The mobile terminal of claim 2, further comprising an antenna switch module configured to generate an operating signal that operates the switch unit according to the control signal.

4. The mobile terminal of claim 1, wherein the ground auxiliary part extends a ground when connected to the ground by a switch unit.

5. The mobile terminal of claim 1, wherein an electric potential of the ground auxiliary part is lowered when connected to the ground.

6. The mobile terminal of claim 1, wherein the ground auxiliary part further includes a ground plate formed on a Printed Circuit Board (PCB).

7. The mobile terminal of claim 6, wherein the ground plate is formed on a side of the PCB opposite to a side of the PCB whereupon the antenna is formed.

8. A method for improving radiation performance and a Specific Absorption Rate (SAR) of an antenna of a mobile terminal, the method comprising:

generating a switching table including at least one switching condition;

determining a frequency band used by the mobile terminal;

searching for, using the switching table, a switching condition corresponding to the determined frequency band; and controlling a ground to be connected with a ground auxiliary part extending the ground according to the searched switching condition, wherein the switching table is generated by:

collecting, according to the frequency band, at least a subset of switching conditions for which a SAR is within a predetermined SAR range, selecting, according to the frequency band, a switching condition from the collected at least a subset of switching conditions for which a minimum Voltage Standing Wave Ratio (VSWR) appears, and generating the switching table based on the selected switching condition.

9. The method of claim 8, wherein the controlling of the ground so as to extend the ground includes controlling switching of contact points connecting between the ground and the ground auxiliary part that provides an extension of the ground according to the switching condition.

10. A mobile terminal including an antenna, a storage unit, and a ground, the mobile terminal comprising:

a controller configured to determine a frequency band, and to generate a control signal according to a switching table including a switching condition corresponding to the determined frequency band;

a ground auxiliary unit having a switchable connection to the ground;

a switch unit configured to switch at least one switch providing the switchable connection between the ground auxiliary unit and the ground based on the control signal; and an antenna switch module configured to switch the at least one switch of the switch unit based on the control signal, wherein the switching table is generated by:

collecting, according to the frequency band, at least a subset of switching conditions for which a Specific Absorption Ratio (SAR) is within a predetermined SAR range, selecting, according to the frequency band, a switching condition from the collected at least a subset of switching conditions for which a minimum Voltage Standing Wave Ratio (VSWR) appears, and generating the switching table based on the selected switching condition.

11. The mobile terminal of claim 10, wherein the ground auxiliary unit extends the ground when connected to the ground by the switching unit.

12. The mobile terminal of claim 10, wherein the ground auxiliary unit is formed of metal.

13. The mobile terminal of claim 10, wherein the ground auxiliary unit further includes a ground plate formed on a Printed Circuit Board (PCB).

14. The mobile terminal of claim 13, wherein the ground plate is formed on a side of the PCB opposite to a side of the PCB whereupon the antenna is formed.

* * * * *